United States Patent Office 3,438,491
Patented Apr. 15, 1969

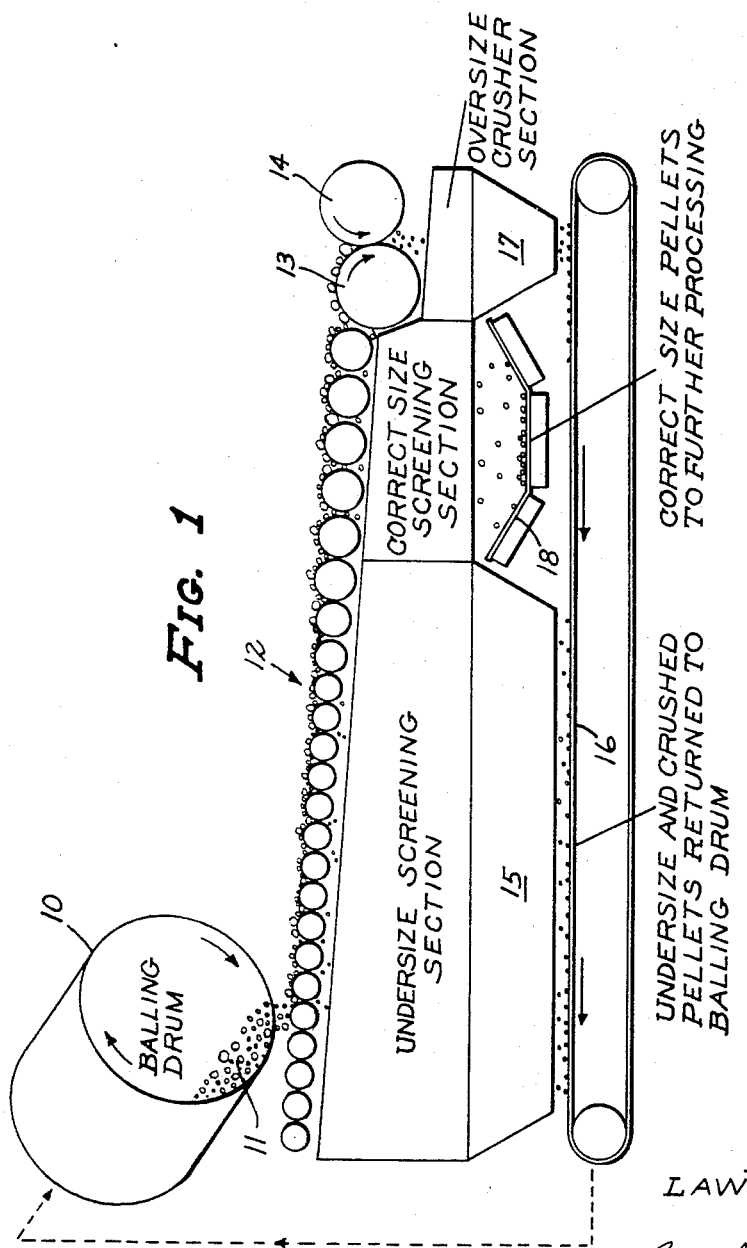

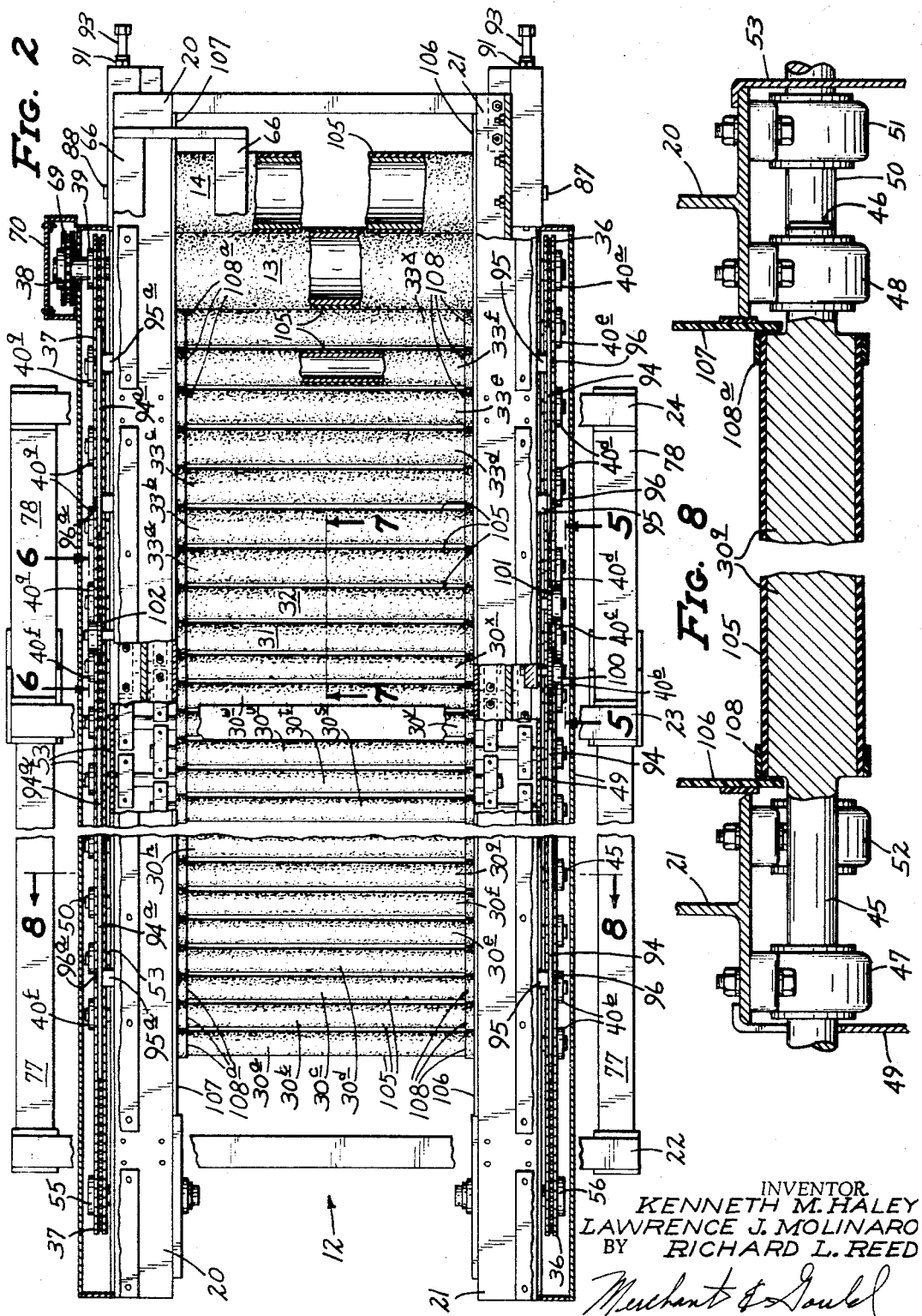

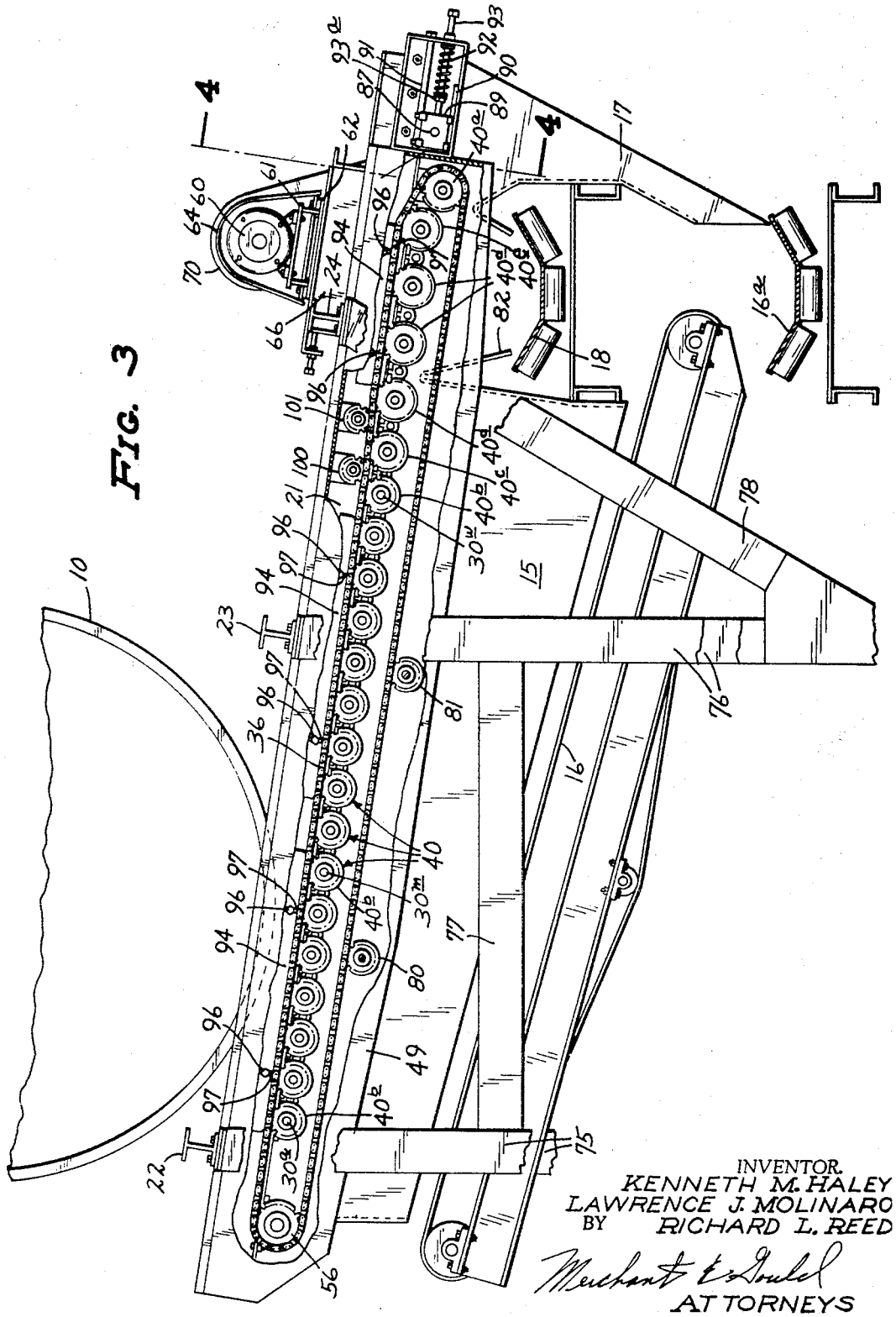

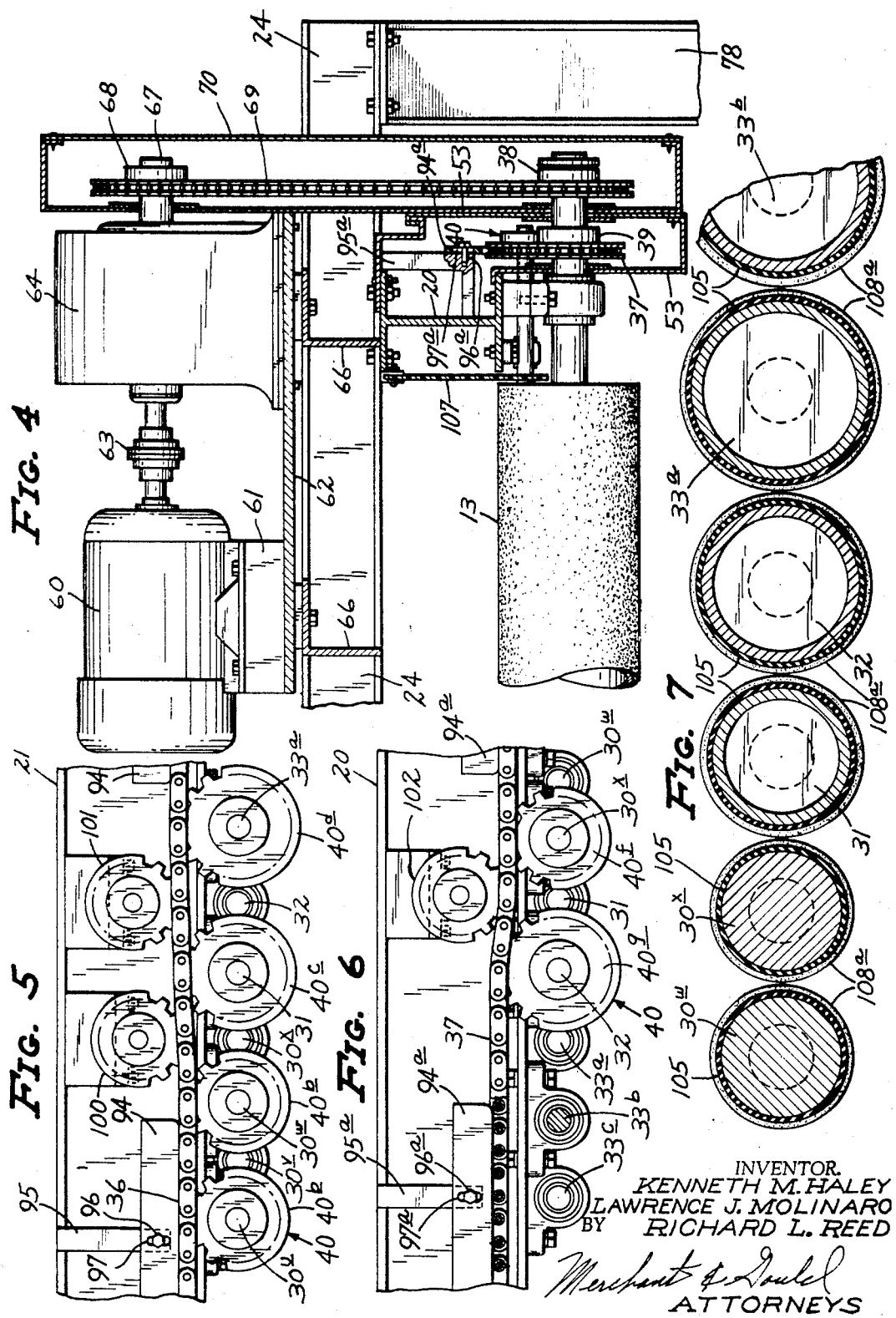

3,438,491
CONVEYING AND CLASSIFYING APPARATUS
Kenneth M. Haley, Lawrence J. Molinaro, and Richard L. Reed, Silver Bay, Minn., assignors to Reserve Mining Company, Silver Bay, Minn., a corporation of Minnesota
Filed Dec. 5, 1966, Ser. No. 599,067
Int. Cl. B07c 5/04, 1/10; B07b 13/04
U.S. Cl. 209—106     7 Claims

ABSTRACT OF THE DISCLOSURE

This application discloses apparatus for conveying, and for classifying according to size, green pellets of finely divided material. The apparatus includes a series of rubber coated rollers that carry the green pellets through first, second, and third screening zones. The rollers are of progressively increasing diameter in the direction of flow of the green pellets. The rollers are spaced so that in the first zone, the undersized green pellets drop through onto a conveyor for reprocessing. In the second zone, the correctly sized green pellets drop through onto a conveyor that carries them to the pellet burning equipment. In the third zone, the oversized green pellets are crushed and are carried away by a conveyor for reprocessing.

---

In recent years, the iron ore industry has developed processes for separating the magnetic ore from taconite. The taconite is first pulverized into a fine powder that is then moistened and formed into green pellets for further processing. The green pellets are normally formed in a balling drum and then conveyed to a pelletizing device that burns the green pellets.

Experience has shown that a bed of closely sized green pellets exhibits considerably better porosity during the pelletizing operation than does a bed of pellets having a wider range of sizes. Typically, green generally spherical pellets ranging from 3/8" to 5/8" in diameter are preferred. Air and other gases can more easily be passed through a bed of these green pellets during the pellet drying and burning, resulting in increased pellet production, improved pellet quality, and better fuel efficiency. If undersized pellets are present in the bed, the drying operation will be impeded because of the poor porosity of the bed. If oversized pellets are present, burning of the pellets is also more difficult and time-consuming. The correct sizing of the green pellets is, therefore, of considerable importance.

In the past, both trommel screens and vibrating screens have been used for the screening of green pellets as they are discharged from a balling drum. A typical trommel screen is disclosed in the Haley et al. Patent 2,834,043 that issued May 13, 1958. The trommel screen is normally attached to the discharge end of the balling drum. The screen is formed from a plurality of spaced rings, each ring lying in a plane perpendicular to the axis of the drum. Undersized pellets or other fragments having sizes smaller than the spacing between the rings drop between the rings onto a conveyor for reprocessing. The correctly sized pellets and the oversized pellets move over the rings and are deposited on another conveyor that carries them to the pellet burning equipment.

A typical vibrating screen for classifying green pellets is disclosed in the Haley Patent 2,707,304 that issued May 3, 1955. The vibrating screen is located at the discharge end of the balling drum. When the pellets are discharged onto the screen the vibration of the screen causes the undersized pellets and other small undesirable particles to drop through the screen. Correctly sized and oversized pellets are again carried by the screen to a conveyor for further processing.

Trommel screens and vibrating screens both have certain undesirable features. First of all, neither of these screens will separate the oversized pellets or particles from the correctly sized pellets. Oversized pellets are, therefore, present in the bed during the pellet burning operation. Further, it has been observed that the material being pelletized would, at times, adhere to the screen rods of the vibrating or trommel screens, thus blinding the screens and causing undersized pellets to be fed from the system. Also, a certain percentage of the fragile green pellets are always mechanically cracked or broken by the trommel or vibrating screens.

Because of the difficulties encountered in utilizing prior art devices, we have invented a new and unique apparatus for conveying, and for classifying according to size, the fragile green pellets that are discharged from the balling drum. The apparatus, according to our invention, not only conveys the pellets from the vicinity of the balling drum to a remote point but also classifies the pellets according to size. Our apparatus first screens out the undersized pellets and other undesirable small particles, then screens out the correctly sized pellets, and finally removes and crushes the oversized green pellets. The undersized green pellets and the crushed oversized green pellets can be returned to the balling drum if desired. The correctly sized green pellets are conveyed to the pellet burning equipment. Test results have indicated that our invention, a roll screen, will do a much better job of conveying and screening the fragile green pellets than will any other device with which we are familiar.

It is, therefore, a primary object of our invention to provide an improved roll screen for conveying and for classifying according to size, the fragile green pellets that are discharged from a balling drum.

Another object of our invention is to provide an improved conveyor having spaced rubber coated rollers for conveying green pellets of finely divided materials.

Further objects and advantages of the present invention will be described in the following specification and in the accompanying drawings in which:

FIG. 1 discloses schematically the roll screen according to our invention;

FIG. 2 is a top plan view, portions thereof broken away and shown in section, of our invention;

FIG. 3 is a side elevation, portions thereof broken away and shown in section, of our invention;

FIG. 4 is a view of the roll screen taken along line 4—4 of FIG. 3, portions thereof being broken away;

FIG. 5 is a fragmentary view of a portion of the roll screen taken along line 5—5 of FIG. 2;

FIG. 6 is a fragmentary view of a portion of the roll screen taken along line 6—6 of FIG. 2;

FIG. 7 is a sectional side view of a portion of the rollers taken along line 7—7 of FIG. 2; and FIG. 8 is a sectional view of one of the rollers taken along line 8—8 of FIG. 2, portions thereof being broken away.

The basic elements of the roll screen are disclosed schematically in FIG. 1. A balling drum 10 rotates at a relatively constant speed in a clockwise direction to produce a flow of fragile green pellets 11.

The material being discharged from balling drum 10 is about half undersize and must be screened from the desired size green pellets. In addition, larger green pellets than desired, and irregularly shaped pieces are discharged from balling drum 10.

Pellets 11, as well as the undesirable materials, are discharged onto a conveyor and classifier 12. Conveyor 12 includes a first undersize screening section, a second center correct size screening section, and a third oversize screening or crusher section. The three sections comprise a series of rollers mounted in parallel for rotation about fixed axes that lie generally perpendicular to the direction of flow of pellets 11. Means, to be described hereinafter with greater detail in connection with FIGS. 2-8, are provided to rotate each of the rollers in a common direction (clockwise), with respect to FIG. 1, to convey pellets 11 from the undersize screening section across the correct size screening section to the oversize section.

Green pellets 11 are caused to advance over the tops of the rollers due to friction between the green pellets and the rollers, the friction in each case being augmented by the pressure of the new green pellets being deposited on the rollers. The rotation of the rollers not only causes the green pellets to advance across the conveyor, but also tends to distribute the green pellets across the width of the rollers.

The rollers in the undersize screening section are spaced apart a distance such that only the undersized green pellets and the other undesirable small particles can drop through. In the preferred embodiment of the invention, the rollers in the undersize screening section are placed ⅜" apart so that all pellets over ⅜" in diameter will be carried by the rollers to the correct size screening section. By the time the pellets reach the correct size screen section, no green pellets or particles smaller than ⅜" in diameter are present.

The green pellets that remain on the conveyor that enter the correct size screening section are all larger than the distance between the rollers in the undersize screening section. The rollers in the correct size screening section are, therefore, spaced a further distance apart, corresponding to the maximum desired correct green pellet size. Again, in the preferred embodiment, the distance between the rollers in the correct size screening section is ⅝". Therefore, all green pellets between ⅜" and ⅝" in diameter will drop between the rollers in the correct size screening section. It is obvious that other roller spacings may be selected if other green pellet sizes are desired.

The green pellets remaining on the conveyor after passage over the correct size screening section will all be larger than ⅝" in diameter. As such, the green pellets are undesirable since they would disturb the pellet burning process. The oversized green pellets are, therefore, passed between a pair of counter-rotating crusher rollers. A first relatively large crusher roller 13 is rotated in the same direction as the remainder of the rollers in the conveyor. The oversized pellets, therefore, roll over the top of crusher roller 13. A second relatively large crusher roller 14 is mounted parallel to and in contact with crusher roller 13. Crusher roller 14 rotates in the opposite direction so that the large particles are drawn between rollers 13 and 14. The oversized green pellets are, therefore, crushed as they pass between the two crusher rollers.

The undersized green pellets drop through a chute 15 onto a second conveyor 16. The crushed oversized pellets drop through a chute 17 onto the same conveyor 16. The undersized green pellets and the crushed oversized green pellets are, therefore, all carried by conveyor 16 to a point where they can be returned to the input end of the balling drum.

The correct size pellets fall onto a conveyor 18 that carries them to further processing, in this case to the pellet burning operation.

The prior art devices, of which we are aware, do not provide the classification function described with regard to the apparatus shown in FIG. 1. Simple roll conveyors have been used in the prior art. The Meyer Patent 2,988,-781 that issued June 20, 1961, discloses apparatus for conveying green pelletized material. The Meyer apparatus is a roll conveyor having spacings between smooth rollers through which the smaller particles can drop. Meyer, however, does not provide means for also separating out the oversized particles or green pellets.

FIG. 1 discloses another improvement that enables our roll screen to do a better job of either conveying or screening or both. The majority of the rollers in the undersize screening section are of the same diameter, 3½" in the preferred embodiment. All of the rollers in the correct size screening section are of a larger diameter, 5" in the preferred embodiment. The last roller in the undersize screening section is also 5" in diameter. A pair of intermediate size rollers, having diameters of 4" and 4½" respectively, are mounted between the 3½" and the 5" rollers. The rollers are therefore progressively increased in diameter along the direction of flow of pellets. The axes of all of the rollers in the undersize and correct size screening sections lie along the same plane, the plane being at an angle of approximately 8½° with respect to the horizontal in the preferred embodiment. Although the entire conveyor is thus somewhat tilted with respect to the horizontal, the progressive increase in diameter of certain of the rollers will at least momentarily cause the pellets to flow along a more horizontal path.

The increase in diameter of the rollers causes an increase in surface speed because of the increased circumference of the rollers. Although means will later be described by which the speed of the rollers can be regulated, the fact that the diameter of a roller is increased necessarily results in an increase in surface speed, all other factors being equal. The surface speed of the rollers is, therefore, progressively increased along the path of flow of the material.

The progressively increased size and/or speed of the rollers result in several improvements in operation. Prior art conveyors having rollers all of the same size, rotating at the same speed, often tended to elongate the initially spherical pellets. An individual pellet would often advance across the entire length of the conveyor without changing its axis of rotation. The result was an elongated or egg-shaped pellet instead of the preferred spherical pellet. It has been observed in the present invention that the pellets tend to reorient themselves as they encounter increases in roller diameter and/or surface speed. The pellets, therefore, rotate about several different axes during their advance across the conveyor to thereby maintain their spherical configuration.

The change in roller diameter and/or speed, in causing the pellets to reorient themselves, also tends to spread the pellets more evenly over the entire width of the conveyor. This more even spreading of the green pellets improves the screening function of the apparatus since the green pellets do not bunch up near the center of the conveyor. Because of the improved distribution, the classifying capacity is also increased.

Referring now to FIG. 2, there is disclosed a top plan view of the roll screen according to our invention, partially in section. Conveyor 12 is mounted in an elongated frame having a pair of parallel side members 20 and 21. Side members 20 and 21 may be of any length necessary to support the conveyor. In the preferred embodiment, side members 20 and 21 are steel H-beams as shown in the cut-away portions of members 20 and 21. Side members 20 and 21 are held in a fixed parallel relationship by being bolted to three cross-braces 22, 23 and 24.

Mounted between side members 20 and 21 are a series of cylindrical rollers journalled in parallel for rotation about fixed axes that lie generally perpendicular to the longitudinal axis of the conveyor.

A first group of rollers, 30a through 30x are of the same diameter, which in the preferred embodiment is 3½". The next downstream roller 31 has a 4" diameter in the preferred embodiment. Roller 32 is 4½" in diameter while rollers 33a through 33x are 5" in diameter. Rollers 30a through 33a are included in the undersize screening section as shown in FIG. 1. Rollers 33b through 33x are included in the correct size screening section.

Mounted adjacent roller 33x is first crusher roller 13 and second crusher roller 14. The surfaces of rollers 33x and 13 are ⅝" apart while crusher rollers 13 and 14 are in contact with each other. Rollers 30a through 33a have their surfaces spaced ⅜" apart. Each of the rollers, except second crusher roller 14 has a sprocket wheel such as 40 attached to one end thereof for engagement with a driving chain. Because the rollers are so closely spaced, the sprocket wheel 40 of alternate ones of rollers 30a–33x are positioned adjacent opposite sides of conveyor 12 to provide adequate clearance. Two drive chains 36 and 37 are thus used, one for each side of the conveyor.

A typical mounting arrangement for the rollers is shown in FIG. 8. FIG. 8 is a sectional view of the conveyor taken along line 8—8 of FIG. 2. Roller 30g has a long stub-shaft 45 extending from one end and a short stub-shaft 46 extending from the other end. Long stub-shaft 45 is journalled for rotation in a bearing support 47 that is bolted to the bottom of side member 21. Short stub-shaft 46 is journalled for rotation in a bearing support 48 that is bolted to the bottom of said member 20. The drive sprocket for roller 30g would be attached to the end of long stub-shaft 45, which extends through a metal shield 49.

Roller 30f, not shown, but which lies behind roller 30g in the view of FIG. 8, has a long stub-shaft 50 extending from the end thereof. Long stub-shaft 50 is journalled for rotation in a bearing support 51 that is bolted to the bottom of side member 20. A short stub-shaft (not shown) extends from the opposite end of roller 30f and is journalled for rotation in a bearing support 52 that is bolted to the bottom of side member 21. The drive sprocket for roller 30f is mounted on the end of long stub-shaft 50, which extends through a metal shield 53.

The remainder of the rollers would be mounted in similar fashion, as shown by the cut-away portion of FIG. 2.

Referring again to FIG. 2, the sprocket wheels adjacent side member 21 are driven by chain 36 while the sprocket wheels adjacent side member 20 are driven by chain 37. The drive sequence for the conveyor is as follows. Power enters a drive wheel 38 mounted on the end of the long stub-shaft extending from first crusher roller 13. Roller 13, therefore, acts as a drive roller. Chain 37 is driven by a sprocket wheel 39, also mounted on the long stub-shaft extending from roller 13, while chain 36 is driven by sprocket wheel 40a, mounted on the short stub-shaft of roller 13. The opposite end of chain 37 is supported by an idler sprocket 56 that is mounted on side member 21.

Since both chain 36 and chain 37 are driven in the same direction from sprockets 39, 40a, all of the rollers, except roller 14, will rotate in the same direction. Roller 14 is driven in the opposite direction by the frictional contact between it and roller 13.

The drive system for the conveyor is shown in FIG. 4. A variable speed drive motor 60 is mounted on a base 61 which in turn is mounted on a support member 62. Support member 62 lies perpendicular to side member 20 and is attached to cross brace 24 by means of braces 66. Motor 60 is connected by a shaft means 63 to a reduction gear system 64. Gear system 64 is firmly attached to cross brace 24 by means of support member 62 and braces 66.

Extending from the end of gear system 64 is a drive shaft 67 having a sprocket wheel 68 mounted thereon. A drive chain 69 connects sprocket wheel 68 to sprocket wheel 38 to drive crusher roller 13. Drive chain 69, sprocket wheel 68 and sprocket wheel 38 are covered by a metal shield 70.

It can be seen from FIG. 4 that when sprocket wheel 38 is rotated in a given direction, sprocket wheel 39 will rotate in the same direction as will crusher roller 13. Drive chain 37 cooperates with sprocket wheels 40 mounted adjacent side member 20 to rotate the corresponding rollers on the conveyor. It is noted that the entire drive chain assembly is surrounded by air-tight metal housings 49 and 53 for safety purposes and to prevent an excess amount of dirt from getting into the system. This also provides means for containing atomized lubricant for the chain.

Referring now to FIGS. 2 and 3, the conveyor is supported by pairs of laterally spaced vertical support members 75 and 76, which are bolted to cross braces 22, 23 respectively, and by a pair of diagonal support members 78 which extend between and are secured to vertical supports 76 and cross brace 24. A pair of generally horizontal support members 77 are bolted to support members 75 and 76.

The outside portion of metal shield 49 has been cut away in FIG. 3, to reveal the chain drive structure for the sprocket wheels located adjacent side member 21. Drive chain 36 extends from drive sprocket 40a to idler sprocket 56 and meshes with all of the sprocket wheels located along side member 21. An additional pair of idler sprocket wheels 80 and 81 are mounted on the frame to support the bottom portion of drive chain 36. Similar sprocket wheels, not shown, are provided to support the bottom portion of chain 37.

It can be seen from FIG. 3 that the correctly sized green pellets fall through metal chute 82 onto conveyor 18. The correctly sized green pellets are carried by conveyor 18 to the pellet burning section of the system.

The undersized green pellets and other small particles that drop through the rollers in the undersize screening section fall onto conveyor 16 that rotates in a clockwise direction as viewed in FIG. 3. The undersized material is transferred by conveyor 16 to another conveyor 16a that returns the material to the balling drum as shown in FIG. 1.

The material entering the oversize crusher section of the roll screen as shown in FIG. 1, passes between rollers 13 and 14. As shown in FIG. 2, roller 14 has a pair of shafts 87 and 88 extending from the ends thereof. Shafts 87 and 88 are each mounted in a sliding pillow block such as 89 shown in FIG. 3. Pillow block 89 is mounted for limited longitudinal motion as guided by a metal track 90 and a metal bolt 91. Pillow block 89 is normally biased to the position shown in FIG. 3 by a heavy spring 92, the tension of which is adjusted by a nut 93a threaded on a bolt 93. Shaft 88, on the opposite end of roller 14 would be mounted in a similar pillow block arrangement.

Under normal conditions, spring 92 forces roller 14 tightly against roller 13. The oversize pellets are therefore easily crushed by rollers 13 and 14. On some occasions, however, an oversized piece of rock or other hard material is mixed with the oversized pellets. The system is not designed to crush such hard rock. Therefore, when the rock passes between rollers 13 and 14, roller 14 is forced away from roller 13 in a direction determined by the sliding pillow blocks. Spring 92, and the spring on the other end, are compressed a sufficient amount to enable the rock to pass between the rollers without damaging them.

The crushed particles from the oversize crusher section pass through metal chute 17 onto conveyor 16a for return to the input of the balling drum as shown schematically in FIG. 1.

FIG. 3 also discloses that the size of the sprocket wheels on the rollers is increased generally as the size of the rollers increase. As previously discussed, the increased roller size caused the surface speed of the rollers to increase. It was determined in actual practice that the surface speed of the rollers could also be regulated to optimum speed by means of changing the size of the sprocket wheels on the rollers. Although the system would operate properly if the same size sprocket wheels were used throughout, it was determined that the surface speed of the larger rollers under such conditions could be too fast for optimum performance. It was, therefore, deemed desirable to reduce slightly the speed of the larger rollers, although still maintaining their surface speed higher than the surface speed of the small rollers. To accomplish this speed regulation function, larger sprocket wheels are used on the larger rollers. The larger sprocket wheels are used on the larger rollers. The larger the sprocket wheel, the slower will be the speed of the surface of the roller. Since the same chain was used to drive all of the sprocket wheels, the number of teeth on the larger sprocket wheels also had to be increased in order that they continued to mesh with the chain.

Referring now to FIG. 5 there is disclosed an end view of a portion of the sprocket wheel and chain drive assembly located near the center of side member 21. The sprocket wheels 40b for rollers 30a through 30w, associated with chain 36, are all of the same size and each has 14 teeth in the preferred embodiment. If the same size sprockets were used on the larger rollers, their surface speed would naturally be increased because of the larger roller diameter. In the preferred embodiment, however, roller 31, which has a diameter of 4", has a larger sprocket wheel 40c with 16 teeth. The teeth are still spaced to fit drive chain 36. The sprocket wheels 40d on roller 33a, 33c and 33e, each have 17 teeth while the sprocket wheels 40e and 40a on rollers 33x and 13 respectively have 16 teeth. The larger sprocket wheels reduce somewhat the surface speed of the larger rollers but the larger rollers still have a surface speed that is faster than that of the smaller rollers. A previously discussed, the surface speed of the rollers progressively increases along the path of flow of the green pellets.

To assure that drive chain 36 remains meshed with all of the sprocket wheels of like dimensions associated therewith there is provided a plurality of hold down bars 94. Hold down bars 94 are each secured to bracket elements 95 which are carried by the side member 21, by means of bolts 96 and are positioned with the undersurface of each thereof overlying and in engagement with the rollers carried by the link connecting pins of the conventional link chain 36. It will be seen by reference to FIGS. 3, 5 that the openings 97 through which the bolts 96 pass are vertically elongated to permit adjustment of the hold down bars 94 with respect to the chain 36. In addition to the hold down bars 94 a pair of hold down sprocket wheels 100, 101 have been mounted on side member 21 above chain 36. Hold down sprocket wheels 100, 101 are mounted at the two points where the sizes of the sprocket wheels on the rollers change and cooperate with the bars 94 to maintain meshing engagement of the chain 36 with all of its associated drive sprockets 40a–40d.

Referring now to FIGS. 2 and 6, the latter thereof discloses a cut away view of the chain drive assembly located opposite to that disclosed in FIG. 5. Again, in the preferred embodiment, the sprocket wheels 40f on rollers 30b–30x, associated with chain 37, have 14 teeth while the sprocket wheels 40g on rollers 32, 33b, 33d, and 33f have 17 teeth. Sprocket 39 has the same number of teeth as sprocket 40a, thus both chains 36, 37 are driven at identical speeds. Since only one shift in sprocket wheel size is present here, a single hold down sprocket wheel 102 in cooperation with hold down bars 94a, identical to hold down bars 94, and carried by side member 20 is sufficient to assure that drive chain 37 remains in mesh with all of the sprocket wheels 40f and 40g. Bars 94a like bars 94 are mounted for vertical adjustments with respect to chain 37 as above described and carry like numerals with the prime character a added.

FIG. 7 discloses in cross section, a number of rollers located at that portion of the conveyor at which the roller diameter progressively increases. Another important feature of the invention is disclosed in FIG. 7. First of all, rollers 30a through 30x are built from a solid rod while the larger rollers are each constructed from a metal tube or pipe. An important feature is the fact that each roller is covered with a layer of rubber such as 105. In the preferred embodiment, a layer of abrasive resistant rubber approximately ¼" thick is vulcanized on each of the rollers. The two crusher rollers are also covered with rubber. The rubber coating is sufficiently flexible so that pieces of scrap or other debris that occasionally contaminate the concentrate, can pass through the rollers without damaging their surface. If found necessary for a particular application, at least the surface of the central portion of the rubber covered rollers can be smoothed or roughened by buffing to regulate the frictional contact between the rollers and the pellets. In some cases a slightly roughened surface causes the pellets to move or be conveyed forward more effectively than with an ordinary smooth roller. If found desirable for a particular application, the entire roll can be buffed to improve operation. A Jade Green rubber manufactured by the Goodyear Rubber Company was used to build the preferred embodiment. Any similar type of abrasive resistant rubber would be satisfactory for the purpose, however, other means of attaching the rubber coating to the rollers might also be employed without departing from the invention.

Another important feature of the invention is disclosed in FIGS. 2, 7 and 8. It was observed during testing that the green pellets had a tendency to hang up on the skirts 106 and 107 at the ends of the rollers. Skirts 106 and 107 are mounted in close proximity to the ends of the rollers to prevent the pellets from falling off the ends. To prevent the pellets from piling up at the ends of the rollers, the diameter of each of the rollers at the opposite ends thereof was increased to slightly less than half the distance between the rollers. The diameter of the roller ends was increased by vulcanizing thereto a layer of rubber having an appropriate thickness to compensate for the spacing between adjacent rollers and having a width of approximately ¾". The two rubber strips at the ends of the rollers are labeled 108 and 108a. The same type of abrasive resistance rubber is used for the strips as that used on the rollers. It was determined that the presence of strips 108 and 108a would prevent green pellets from piling up against skirts 106 and 107. Skirts 106 and 107 are built from a high density linear polyethylene plastic to give the best results. If strips 108 and 108a are not used, the ends of the rollers tend to wear more rapidly than do the center portions.

The entire specification thus far has described our invention in terms of the preferred embodiment. Particular operating circumstances, however, might dictate some deviation from this preferred structure. For example, if space is at a premium, it might be necessary or desirable to utilize a single roller size throughout, except for the crusher section. If rollers having a 3½ inch diameter were used throughout the undersize and correct size screening sections, it can be seen that the conveying and classifying apparatus of our invention would be much shorter than if larger diameter rollers were used, as in the preferred embodiment.

Another feature that can be varied to improve operation in certain circumstances, without departing from the invention, is the spacing of the rollers. As previously mentioned, the preferred spacing is ⅜ inch for the undersize screening section and ⅝ inch for the correct size screening section. In testing apparatus built according to this invention, it was found that with some systems, the oversized green pellets tended to hang up short of the crusher rollers. This would occur when all of the undersize and correct size green pellets were completely screened two or three rollers ahead of the crusher rollers, thus leaving only a few oversized green pellets to transverse the remaining distance to the crusher rollers. A single oversized green pellet, with no other pellets in contact with it to aid in moving it along, would sometimes hang up between two rollers just short of the crusher section. This green pellet would gradually elongate and drop through into the correct size conveyor, an undesirable situation. To remedy this situation, the roll speed is controlled to keep the rolls loaded throughout the correct size screening section. The increased speed and/or diameter of the crusher roller tends to slightly reorient the oversized green pellets and causes them to move along in a continuous fashion.

The above examples are illustrative of changes that can be made to improve operation of the conveying and classifying apparatus of our invention without departing from the invention.

The specification has described the invention in terms of the preferred embodiment. The dimensions of the apparatus and the other variables disclosed were determined to be optimum for the preferred embodiment. Although the preferred value of the dimensions and the preferred values of the other variables have been disclosed herein, such values must be determined in each case depending upon the application of the invention. Appropriate values can therefore be determined by those skilled in the art, as can possible modifications and adaptions of the structures herein disclosed, without departing from the inventive concept. Consequently, it is to be understood that the invention should not be limited to the details disclosed, but should be limited only by the spirit and scope of the appended claims.

What is claimed is:

1. Apparatus for conveying, and for classifying according to size, green pellets, comprising:
    (a) a conveyor having a first screening section, a second screening section, and a third section; said sections comprising a series of rollers covered with a first layer of abrasive resistant rubber journalled for rotation about fixed axes that lie generally perpendicular to the direction of flow of said green pellets, said conveyor being adapted to receive a flow of green pellets on said rollers in said first section, said green pellets comprising undersized green pellets, correctly sized green pellets and oversized green pellets;
    (b) means for rotating said rollers to spread said green pellets across said rollers and to convey said green pellets toward said third section, said rollers in said first section being spaced a distance apart such that said undersized green pellets drop between said rollers, said rollers in said second section being spaced apart such that said correctly sized green pellets drop between said rollers, said oversized green pellets being conveyed to said third section; and
    (c) a second layer of rubber attached to each end of said rollers to extend the diameter of said roller ends to slightly less than half the distance between rollers so that said green pellets will not bunch up at the ends of said rollers.

2. Apparatus for conveying, and for classifying according to size, green pellets, comprising:
    (a) a conveyor having a first screening section, a second screening section, and a third section; said sections comprising a series of rollers journalled for rotation about fixed axes that lie generally perpendicular to the direction of flow of said green pellets, said conveyor being adapted to receive from a ball-forming device a flow of green pellets on said rollers in said first section, said green pellets comprising undersized green pellets, correctly sized green pellets and oversized green pellets;
    (b) means for rotating said rollers to spread said green pellets across said rollers and to convey said green pellets toward said third section, said rollers in said first section being spaced a distance apart such that said undersized green pellets drop between said rollers, said rollers in said second section being spaced apart such that said correctly sized green pellets drop between said rollers, said oversized green pellets being conveyed to said third section;
    (c) means in said third section to crush said oversized green pellets;
    (d) second conveyor means to return said undersized green pellets and said crushed oversized green pellets to said ball-forming device; and
    (e) third conveyor means to carry said correctly sized green pellets to further processing.

3. Apparatus according to claim 2 in which the last roller in said third section is a relatively large first crusher roller, in which a second relatively large crusher roller is mounted in close proximity to and in parallel with said first crusher roller, and in which means are provided to drive said second crusher roller in a direction opposite to that in which said first crusher roller is rotating, said oversized green pellets passing between said crusher rollers where they are crushed into small pieces for further processing.

4. Apparatus according to claim 2 in which said third section includes a first relatively large rubber coated crusher roller over which pass said oversized green pellets and large pieces of rock or debris, and in which a second relatively large rubber coated crusher roller is mounted adjacent said first crusher roller for rotation in the opposite direction, said oversized green pellets being crushed between said crusher rollers, said second crusher roller being spring loaded so that said large pieces of rock or debris can pass between said crusher rollers without causing damage thereto.

5. Apparatus for conveying and for classifying according to size, green pellets, comprising:
    (a) a conveyor having a first screening section, a second screening section, and a third section; said sections comprising a series of rollers journalled for rotation about fixed axes that lie generally perpendicular to the direction of flow of said green pellets, said conveyor being adapted to receive a flow of green pellets on said rollers in said first section, said green pellets comprising undersized green pellets, correctly sized green pellets and oversized green pellets;
    (b) means for rotating said rollers to spread said green pellets across said rollers and to convey said green pellets toward said third section, said rollers in said first section being spaced a distance apart such that said undersized green pellets drop between said rollers, said rollers in said second section being spaced apart such that said correctly sized green pellets drop between said rollers, said oversized green pellets being conveyed to said third section; and
    (c) a first set of sprocket wheels attached to one end of said rollers, a second set of sprocket wheels attached to the other end of said rollers, a first drive chain meshed with said first set of sprocket wheels, a second drive chain meshed with said second set of sprocket wheels, means including a drive motor for driving said drive chains, and means for holding said drive chains in mesh with said sprocket wheels including at least a pair of hold down bars mounted so that each bar engages one of said drive chains on the side thereof opposite said sprocket wheels.

6. Apparatus according to claim 5 in which said drive chains each comprise a plurality of links connected by pins having rollers thereon that mesh with the teeth on said sprocket wheels, in which said hold down bars lie between the sides of said links in engagement with said rollers on said pins to prevent said drive chains from slipping off said sprocket wheels, and in which means are provided to adjust the position to said hold down bars.

7. Apparatus for conveying green pellets, comprising:
    (a) a frame;
    (b) a series of spaced rollers journalled to said frame for rotation about fixed axes that lie generally perpendicular to the direction of flow of said green pellets; and
    (c) each of said rollers having a first layer of abrasive resistant, resilient material attached to and covering the surface thereof, and a second layer of abrasive resistant, resilient material attached to each end of said rollers to extend the diameter of said roller ends to slightly less than half the distance between rollers so that said green pellets will not bunch up at the ends of said rollers.

References Cited

UNITED STATES PATENTS

| | | | |
|---|---|---|---|
| 1,683,918 | 9/1928 | Riddell | 209—106 |
| 2,370,539 | 2/1945 | Hodecker | 209—106 |
| 2,971,703 | 2/1961 | Rath | 209—106 X |
| 2,974,793 | 3/1961 | Kuntz | 209—106 |

FOREIGN PATENTS 275,099   8/1927   Great Britain.

ALLEN N. KNOWLES, *Primary Examiner.*